Oct. 7, 1930.  A. L. DE LEEUW  1,777,962
CHUCK
Original Filed Jan. 30, 1923   3 Sheets-Sheet 1
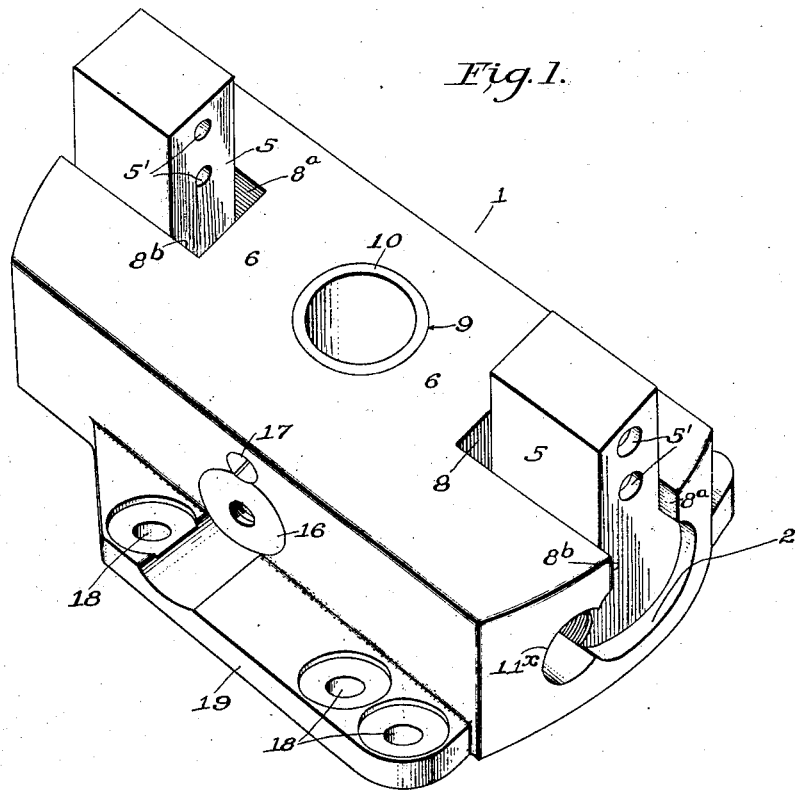
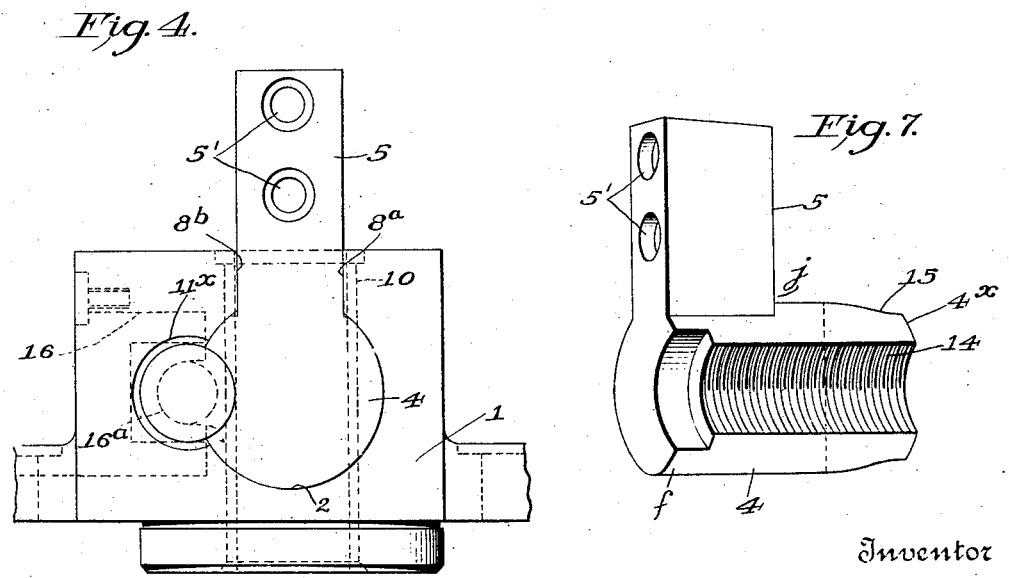
Inventor
Adolph L. De Leeuw
By Attorney
Albert F. Nathan Oct. 7, 1930.    A. L. DE LEEUW    1,777,962
CHUCK
Original Filed Jan. 30, 1923    3 Sheets-Sheet 2
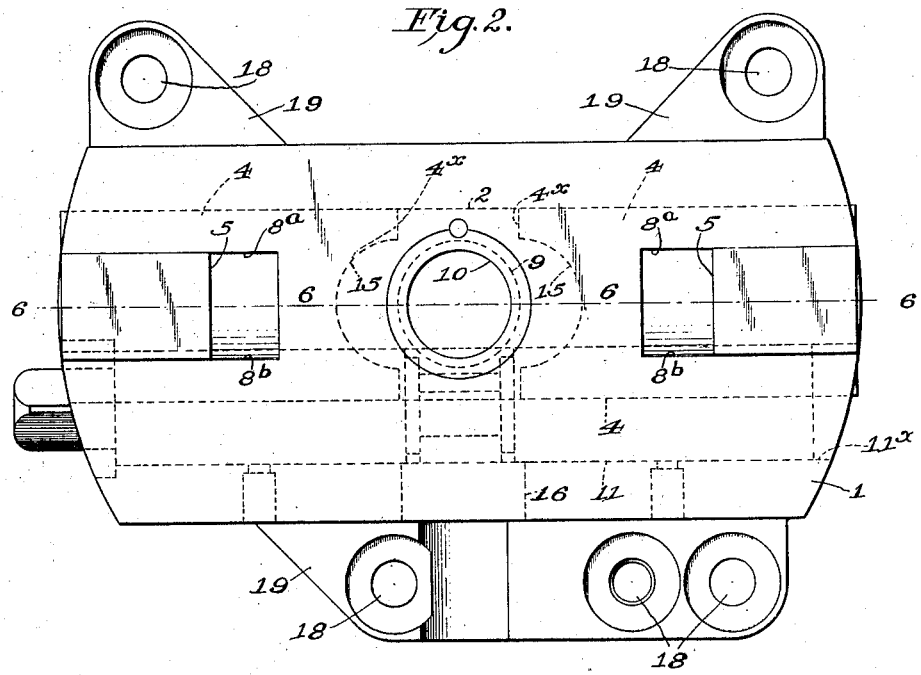
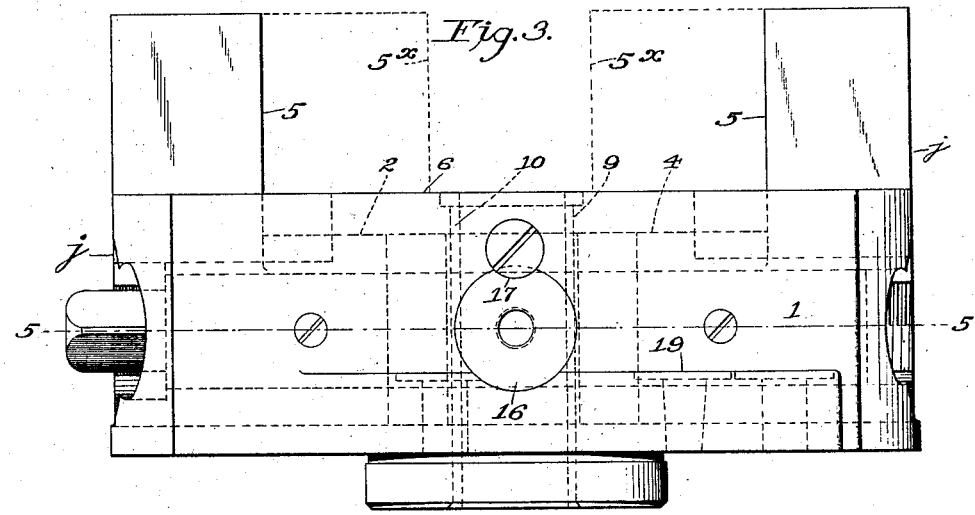
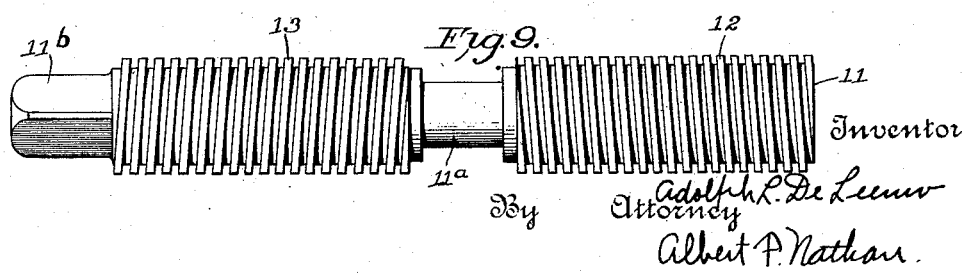

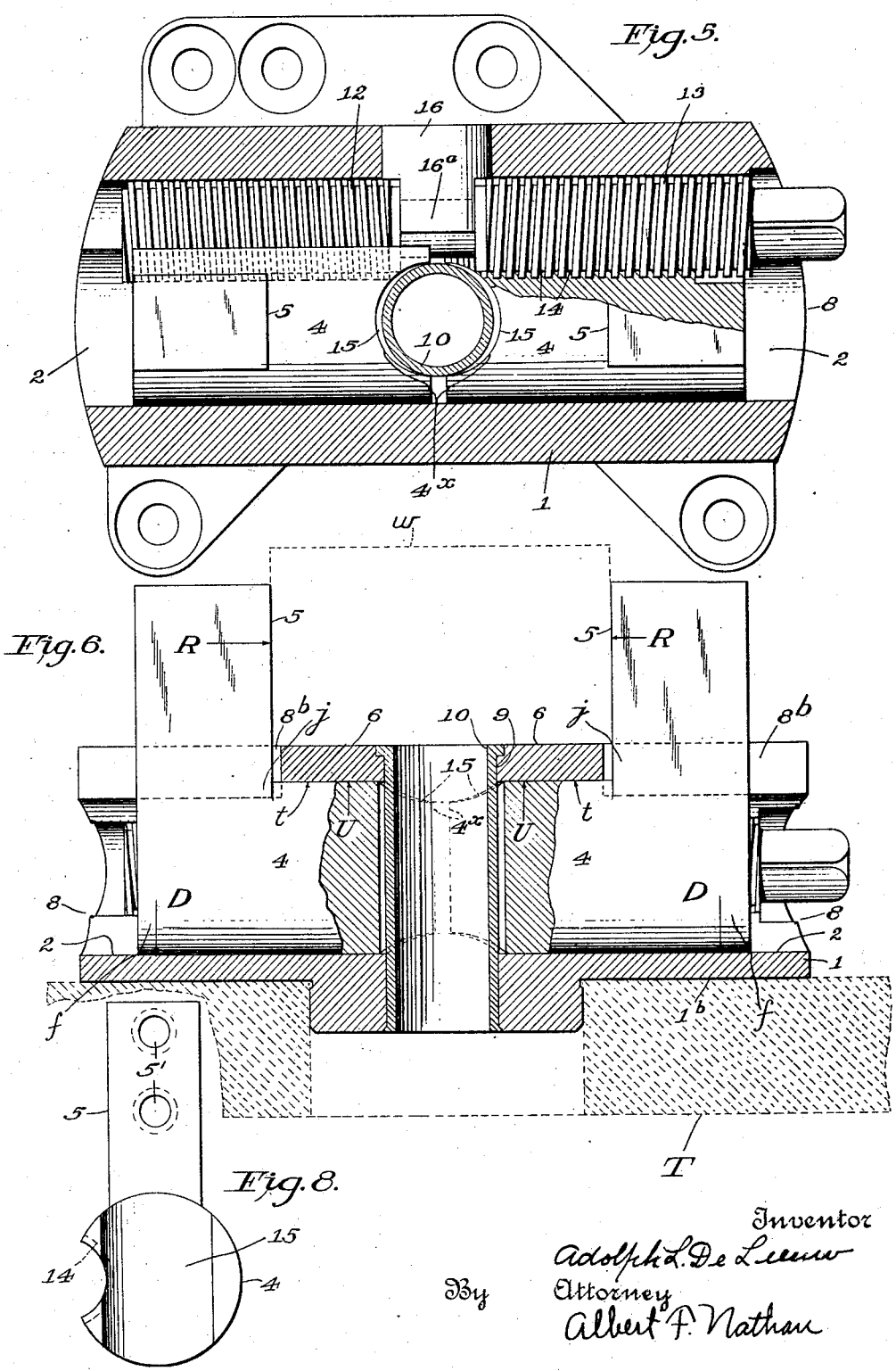

Patented Oct. 7, 1930

1,777,962

UNITED STATES PATENT OFFICE

ADOLPH L. DE LEEUW, OF PLAINFIELD, NEW JERSEY, ASSIGNOR TO THE GOSS AND DE LEEUW MACHINE COMPANY, OF NEW BRITAIN, CONNECTICUT, A CORPORATION OF CONNECTICUT

CHUCK

Original application filed January 30, 1923, Serial No. 615,884. Divided and this application filed May 20, 1924. Serial No. 714,591.

This invention deals with chucks in the nature of adjustable devices for clamping and holding the work while being machined and this application is a division of that filed by me on January 30, 1923, and bearing Serial Number 615,884.

Chucks of this nature habitually comprise a base formed with a plurality of open undercut guideways within each of which is slidably mounted a work-holding jaw having an outwardly projecting work-engaging portion. These guideways radiate from an open common center toward which each jaw is forced to grip the work by suitable means such as a screw threaded through the base of the jaw.

The metal blank so chucked is, by the cutting tool, subjected to severe strains and, to hold it against displacement, it is necessary that the jaws be urged against the work with great pressure. The counter-action of this pressure tends to overturn the jaws and the lateral, and relatively weak guideways of the body of the chuck are depended upon to hold the jaws against displacement. It has long been realized that even the slightest flexure of either the base or the jaws will permit the work-engaging surface of the jaws to assume an angle with respect to the work, with the result that the work would be insecurely gripped; in which event a high degree of precision in the tooling operation would be rendered impossible. Notwithstanding every effort to make the chucks strong and accurate, this defect is repeatedly manifested and appears to be due to the fact that the conventional design does not inhibit the side-walls from spreading slightly or the guide-ways from springing somewhat.

This invention has for an object to overcome the inherent defects of chucks of this nature by providing a new design, departing from certain mechanical principles heretofore employed, thereby attaining a structure which is capable of withstanding, without flexure, all of the strains to which these devices are subjected.

A further object of the invention is so to improve the chuck that, in addition to its superior qualities, it will also be easy of manufacture and well adapted to be finished and fitted with greater precision than has heretofore been possible.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which :—

Fig. 1 is a perspective view of a chuck embodying the present invention. Fig. 2 is a face view thereof. Fig. 3 is a side elevation of Fig. 2. Fig. 4 is a right hand end view of Fig. 2. Fig. 5 is a section on the line 5—5 of Fig. 3. Fig. 6 is a section on the line 6—6 of Fig. 2. Fig. 7 is a perspective view of one of the work-holding jaws. Fig. 8 is an end view thereof and Fig. 9 is a side view of the screw for shifting the work-holding jaws to cause them to engage and release the work.

In attaining its objective, this invention fulcrums each jaw-block at its inner end against the rear interior face of a body-portion which continues unbroken in a circular direction; and fulcrums the outer end of the jaw-block against the rear wall of the body; avoiding the prolongation of the radially open-slots to the center of the body. In this invention, the radial open-slots originate at their inner ends at a distance from the center (the distance being not less than the traverse of the jaw) and do not merge together as in the conventional arrangement. Radial tunnels, of a length somewhat greater than the traverse of the jaw, open into the inner ends of the open-slots and receive the inner ends of the jaw-blocks; the outer ends of said jaw-blocks being fulcrumed preferably against the bottom of the open-slots. With this construction the pressure of the jaw on the work tends rather to contract than spread the open slots in which the jaws are adjustably mounted and thereby grip the jaws and maintain their work-engaging surfaces parallel; all as distinguished from conventional chucks in which the same pressure tends to spread apart the walls of the open slots and permit the jaws to assume an angle with respect to the work, and to each other.

To this end the jaw-blocks $j$ may each be formed with a foot-portion 4 and a laterally offset work-engaging portion 5. The foot-portion provides, at one end, a toe $4^x$ which is slidably fitted in a tunnel $t$ formed in the central portion of the chuck body 1, and at the other end it is provided with a heel portion $f$, located within an open channel or slot later to be referred to. Above the tunnel, and overlying the toe portions $4^x$, is a wall or bridge 6 which receives the outward pressure of the toe portions when the jaws are gripped upon the work. This bridge is integral with the central portion of the chuck-body and may readily be made of a strength sufficient to withstand the strain to which it is subjected. The point of contact between the toe portions $4^x$ and the inner surface or ceiling of the bridge forms one of the fulcrum points about which the jaw-blocks are inclined to turn when they are gripped tightly upon the work. As outward movement of the toes $4^x$ is prevented by the bridge 6 the strain on the jaws tends to force inwardly the opposite or heel ends of the feet.

This invention also provides means to counteract this strain by causing the rearward ends of the jaw-blocks to bear downwardly on the chuck body; preferably in such a manner that they also exert a closing strain on the open slots in the chuck-body. One convenient means for accomplishing this result consists in causing the heel portions $f$ to bear directly on the bottoms 2 of the slots 8 which extend outwardly from the outer ends of the tunnels $t$. When the jaws 5 grip the work W as shown in Fig. 6, pressure is applied in the direction of the arrows R and two oppositely directed strains are transmitted by the foot portion to the chuck-body. The upward or outward strain, as represented by the arrow U, is effectively resisted by the bridge 6 and the inward or downward strain, as represented by the arrow D, is likewise resisted by the chuck-body proper. In prior chucks, it is these strains that have caused the deflection of the work-engaging portions of the jaws, thereby causing them to become "bell-mouthed" to the end that work placed therein is insecurely held.

From the foregoing it will be observed that the present invention has provided simple and efficient means for resisting the overturning strains to which the jaws are subjected, and the work engaging surfaces are accurately maintained in their predetermined relation.

To prevent the jaws $j$ from being tipped laterally the portions 5 are preferably fitted between the opposed walls $8^a$ and $8^b$ of the slots 8. These walls also serve to guide the jaws in their movements toward and from the center of the chuck.

An important feature of this invention is the contour of the tunnel in the body portion of the chuck and of the correspondingly shaped toes of the jaw-blocks fitted therein. It is proposed to give these parts a simple contour which may be machined and finished with greater precision, than has heretofore been possible and thereby obtain a better working fit between them. These toes, and the tunnels in which they are fitted, may be of any desired shape such as square, round or other shapes which may be finished with great precision but it is desirable to have the toe portions formed of a solid piece so that the strain is taken by the whole and not merely by a relatively small portion of the jaw as in conventional chucks.

If the diameter of the work to be held is less than the distance between the work holding portions 5, when adjusted to their innermost positions, auxiliary jaws $5^x$ (see Fig. 3) may be attached to the portions 5, as by means of screws passed through the holes $5'$ and threaded into the auxiliary jaws. The jaws $j$ are urged toward the center of the chuck to grip the work by suitable screw devices which, in two-jaw chucks, may comprise a screw 11 as shown in Fig. 9. This screw is formed with right and left-hand threaded portions 12 and 13 respectively which have threaded connections with the feet 4 of the jaw-blocks. Any suitable means, such as a wrench applied to the squared end $11^b$ may be provided for turning the screw to cause the jaws to grip and release the work.

Some machining operations, such as the turning of rods etc. require that the work extend through the plane of the chuck. Chucks for this class of work may be provided with a central aperture 9, extending through the body of the chuck. To prevent the entrance of dirt and cuttings to the inside of the chuck this aperture is preferably fitted with a sleeve or bushing 10.

The inner ends of the toe portions of the jaw-blocks are preferably bifurcated as at 15 so as to straddle the bushing 10 when the jaws are adjusted to their innermost positions. This permits of a longer toe portion which increases its leverage and thereby reduces the strain on the bridge 6.

In chucks formed with this central aperture it is necessary to provide adjusting means for the jaws which will not interfere with the passage of the work through the opening. This may be accomplished, as shown in the drawings, by locating the adjusting screw 11 at one side of the center of the chuck and forming the feet of the jaws with threaded sockets located at one side of the center of the feet. The screw 11 may be located in a bore 11ˣ in the body of the chuck and held against endwise movement therein by a retainer 16 let into the side of the base and held therein by a screw 17. This retainer is formed with a forked end 16ᵃ which embraces a reduced portion 11ᵃ of the screw intermediate the right and left-hand threads.

In use, the chuck may be mounted on the usual turret T (shown in dotted lines only, Fig. 6) as by means of suitable bolts passed through apertures 18 in feet 19 formed integral with the body portion of the chuck.

From the foregoing, it will be observed that I have provided a chuck which is easy of manufacture (all of the parts being of shapes which may easily be machined and finished with extreme precision) and which will effectively resist, without distortion or damage, the stresses which have heretofore been fatal to many chucks of this nature.

It is to be remembered that, although I have disclosed this invention as embodied in a two jaw chuck in which the toe portions are cylindrical and the adjusting screw is located at one side of the axis of the shank, it is recognized that the invention is likewise adaptable to various other forms of chucks having a different number of jaws which may also be of different design and differently adjusted.

Without further analysis, the foregoing will so fully reveal the gist of this invention that others can, by applying current knowledge, readily adapt it for various utilizations by retaining one or more of the features that, from the standpoint of the prior art, fairly constitutes essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A chuck for machine tools combining a base provided with a tunnel-bore having an unbroken wall and an open slot; a jaw having a toe projecting into said tunnel bore and engaging an overlying wall thereof and a jaw proper emerging from said open slot; and means for moving said jaw in said bore.

2. A chuck for machine tools combining a base provided with a tunnel-bore spaced inwardly from the periphery of said base and having an unbroken wall; a work-holding jaw having a toe projecting into said tunnel bore and engaging an overlying wall thereof, and a heel portion contacting with an underlying wall of said base exteriorly of said tunnel bore; and means for moving said jaw in said bore.

3. A chuck combining a body having an open channel radiating inwardly and terminating short of the axis and providing an open slot, said body having a tunnel radiating inwardly from the end of said open channel; a jaw-block having its foot located within said open channel and having a toe extended into said tunnel and bearing against the ceiling of said tunnel to resist over-turn of said jaw-block, said jaw-block having a jaw emerging through the open-slot of said channel; and adjusting means for forcibly shifting said jaw-block radially along said channel.

4. A chuck combining a body having an open channel radiating inwardly and terminating short of the axis and providing an open slot, said body having a tunnel radiating inwardly from the end of said open channel; a jaw-block having its foot located within said open channel and having its heel bearing against the bottom of said open channel and also having a toe extended into said tunnel and bearing against the ceiling of said tunnel to resist over-turn of said jaw-block, said jaw-block having a jaw emerging through the open-slot of said channel; and adjusting means for forcibly shifting said jaw-block radially along said channel.

5. A chuck combining a body having two diametrically-opposite open channels radiating inwardly and terminating short of the axis, said body having a single tunnel-bore having an unbroken wall connecting the inner ends of said open channels; jaw-blocks having their feet located within the respective open channels and each having a toe extended into the opposite ends of the tunnel-bore and bearing against the ceiling thereof to resist over-turn, each jaw-block having a jaw emerging through the open-slot of its channel; a single right-and-left screw threaded through the feet of said jaw-blocks for forcibly shifting them radially along said channels.

6. A chuck for machine tools combining a base provided with a tunnel bore providing an overlying bridge portion, connecting together the side walls of said tunnel bore and a clearance slot adjacent the outer end of said tunnel bore; a jaw-block arranged partly within the bore and in engagement with said bridge portion within said bore and partly within the slot and means for moving said jaw in said bore and slot.

7. A chuck for machine tools combining a base provided with a tunnel-bore having an unbroken wall and an open slot extending outwardly from said tunnel-bore; a jaw-block formed with a foot having a toe portion projecting into and contacting with a wall of said tunnel-bore and a jaw proper emerging from said open slot and provided with a work engaging surface, the foot portion of said jaw block being provided with fulcrum points at opposite sides of the plane of the work engaging surface, one of said fulcrum points being on said toe portion and engaging the unbroken wall of said tunnel-bore; and means, provided by the base and engaging the jaw-block adjacent its fulcrum points for resisting the overturning strains to which the jaw-block is subjected.

8. A chuck for machine tools combining a base provided with a tunnel-bore having an unbroken wall and an open slot extending inwardly from the periphery of the chuck and terminating a substantial distance from the center thereof and connecting with said tunnel-bore, a substantially L-shaped jaw comprising a foot slidable in said tunnel, and a work-engaging portion projecting through said slot; means for moving said jaw in said tunnel; and a rigid central bridge-portion wholly overlying and contacting with a portion of said foot in all of the adjusted positions of said jaw to resist the overturning strains to which the jaw is subjected.

9. A chuck for machine tools combining a base provided with diametrically opposite slots and a tunnel-bore connecting said slots, said tunnel-bore having integrally formed and unbroken bottom, side and ceiling walls; jaw-blocks having toe portions extending inwardly into opposite ends of said tunnel and contacting with a wall therein and work engaging portions projecting outwardly through said slots; and means for moving said jaw-blocks toward the center of the chuck.

10. A chuck combining a base; a substantially L-shaped member slidable thereon and comprising a work-holding jaw and a foot extending inwardly therefrom, said foot being provided with a toe portion located at one side of the plane of contact between the jaw and the work held therein; and a heel portion at the opposite side of said plane, said base having an uninterrupted portion overlying and contacting with the toe and a portion underlying and contacting with the heel to prevent overturn of the member.

11. A chuck for machine tools combining a base provided with an internal bore; a plurality of work holding jaws having inwardly projecting toes slidable in said bore; means for moving said jaws in said bore; and a bridge wholly overlying and contacting with the inner ends of said toes to receive the outward pressure thereof when the jaws are forced against the work; said bridge and base being formed with a central aperture transverse to the bore for reception of the work.

12. A chuck for machine tools combining a base provided with an internal bore; a plurality of work holding jaws having inwardly projecting toes slidable in said bore; means for moving said jaws in said bore; a bridge wholly overlying and contacting with the inner ends of said toes to receive the outward pressure thereof when the jaws are forced against the work; said bridge being formed with a central aperture transverse to the bore for reception of the work; and a protecting sleeve in said aperture and extending through said base.

13. A chuck as set forth in claim 12 characterized by this, that the inner ends of the toes are bifurcated to embrace the sleeve when the jaws are adjusted to their innermost positions.

14. A chuck for machine tools combining a base provided with a tunnel-bore having an unbroken wall and a plurality of clearance apertures extending inwardly from the ends of said base; a plurality of jaw-blocks having feet fitted within said bore and laterally projecting work-engaging portions extending through said clearance apertures; and a screw for adjusting said jaws toward and from the center of the chuck.

15. A chuck comprising a base provided with a substantially cylindrical bore and a plurality of clearance apertures extending inwardly from the ends of said base; a plurality of L-shaped jaw-blocks having feet slidable in said bore and work engaging portions extending outwardly through said clearance apertures; a bridge, formed integrally with said base, overlying and coacting with the toe ends of said feet to prevent outward movement thereof when the jaws are tightened upon the work; and means for moving said jaws.

16. A chuck combining a base provided with a circular bore having an unbroken wall and arcuate channels providing a plurality of clearance apertures extending inwardly from the outer edges of said base and terminating adjacent said bore; a plurality of jaw-blocks having cylindrical toe portions slidable in said bore, rounded heel portions slidable in said channels and work engaging portions extending through said clearance apertures; and means for moving said jaw blocks.

17. A chuck combining a base provided with a tunnel bore and open channels extending inwardly from the periphery of the chuck and terminating short of its axis; jaw-blocks having foot portions in said channels and toe portions extending into said tunnel bore; a rigid bridge formed integral with said base and overlying and engaging said toe portions in all of their positions in said tunnel bore; and means to move said jaw-blocks in said channels and tunnel bore.

18. A chuck combining a base provided with a circular bore having an unbroken wall; a jaw block having a cylindrical portion slidingly fitted within said circular bore and engaging the wall thereof to prevent overturning of said jaw block and a work-engaging portion projecting from said cylindrical portion; and means to move said jaw-block axially of said circular bore.

19. A chuck combining a base provided with a circular bore affording a slideway for jaw-blocks, and a rigid bridge adjacent the axis of said chuck, said bridge connecting together the side walls of said bore; jaw-blocks having cylindrical foot portions slidingly mounted in said bore and having their innermost ends underlying and engaging said bridge; and means to move said jaw-blocks axially of said bore.

20. A chuck combining a base provided with a circular bore intersecting the axis of said chuck and affording a slideway for jaw-blocks, the outer wall of said bore, adjacent the axis of the chuck, constituting a bridge integral with said base; jaw-blocks having cylindrical foot portions underlying said bridge and slidingly fitted within said bore and engaging said bridge at opposite sides of said axis; and means for moving said jaw-blocks in said bore.

21. A chuck combining a base provided with a tunnel-bore having an unbroken wall and affording a slideway for a jaw block, the outer wall of said bore adjacent the axis of said chuck constituting a rigid bridge connecting together the side walls of said bore; a jaw-block having a foot portion slidable within said bore and engaging the underside of said bridge and a work-holding portion projecting from said foot portion, the said bridge terminating remote from the periphery of the base to permit unobstructed movement of said work-holding portion; and means to move said jaw-block axially of said bore.

22. A chuck combining a base provided with a round bore intersecting the axis of said chuck, the outer wall of said bore adjacent said axis constituting a rigid bridge integral with said base and serving to connect together the side walls of said bore, said outer wall also being interrupted at the opposite sides of the axis of said chuck and remote therefrom, thereby providing open channels and clearance apertures; jaw-blocks fitted within said bore at opposite sides of said axis, said jaw-blocks having foot-portions provided with toes fitted within said closed bore beneath and engaging said bridge, rounded heel portions within said open channels and work engaging portions projecting through said clearance apertures; and means to move said jaw-blocks axially of said bore.

In witness whereof, I hereunto subscribe my name.

ADOLPH L. DE LEEUW.